(12) United States Patent
Minichiello

(10) Patent No.: US 11,200,608 B2
(45) Date of Patent: Dec. 14, 2021

(54) SYSTEM AND METHOD FOR ITEM AND FINANCIAL EXCHANGES

(71) Applicant: John Martin Minichiello, Stoneham, ME (US)

(72) Inventor: John Martin Minichiello, Stoneham, ME (US)

( * ) Notice: Subject to any disclaimer, the term of this patent is extended or adjusted under 35 U.S.C. 154(b) by 27 days.

(21) Appl. No.: 16/531,059

(22) Filed: Aug. 3, 2019

(65) Prior Publication Data

US 2020/0043069 A1 Feb. 6, 2020

Related U.S. Application Data

(60) Provisional application No. 62/714,309, filed on Aug. 3, 2018.

(51) Int. Cl.
*G06Q 30/00* (2012.01)
*G06Q 30/06* (2012.01)
*G06Q 20/24* (2012.01)

(52) U.S. Cl.
CPC ......... *G06Q 30/0619* (2013.01); *G06Q 20/24* (2013.01)

(58) Field of Classification Search
None
See application file for complete search history.

(56) References Cited

U.S. PATENT DOCUMENTS

2014/0046782 A1* 2/2014 Brunn .................. G06Q 20/351
705/17

* cited by examiner

*Primary Examiner* — Mila Airapetian
(74) *Attorney, Agent, or Firm* — John Rizvi; John Rizvi, P.A.—The Patent Professor ®

(57) ABSTRACT

A system and a method are provided to enable a user to post on the internet an item for sale, obtain a credit therefor, access the credit and convey the item to a buyer. The system includes a database of information and an item upload function arranged to enable the user to post information about an item that the user wishes to sell. The system further includes a credit establishment function establishes a credit for the user based on the posting, wherein the credit establishment function is arranged to make the credit available for the user to access immediately upon posting the item. A credit usage function permits the user to store the credit or convert the credit into funds accessible by the user. A reporting aspect of the system enables the user to see credit usage and availability information.

6 Claims, 6 Drawing Sheets

SYSTEM AND METHOD FOR ITEM AND FINANCIAL EXCHANGES

BACKGROUND OF THE INVENTION

1. Field of the Invention

The present invention relates to a system and a method configured to enable users to make available goods and services available through the internet. More specifically, the system and method are configured to enable users to obtain advance funding, which includes bartered services as an option, in anticipation of selling the goods or services, which advance funding may be accessed through the system.

2. Description of the Prior Art

Currently, there exists two primary mechanisms through which an individual can transfer his or her ownership in goods or services for some form of disbursement. That disbursement can be in the form of money or alternative goods or services as a form of barter. The most traditional mechanism for doing so is the pawn shop. The pawn shop operates by requiring the individual to transfer possession of an article in exchange for funds. The shop operator determines the monetary value of the article, conveys funds reflecting that value, and takes possession of the article. The owner of the article may recover possession of the article upon returning the funds, under agreed-to conditions. Alternatively, if the conditions are not met, the operator may sell the article and the original owner loses ownership of the article. There are physical pawn shops that operate this way. There are also internet-based pawn shops that also operate this way, requiring the original owner to deliver the article for retention before gaining access to funds designated by the operator.

The second of the two primary mechanisms enabling the exchange of an article (or services) in exchange for funds (or alternative consideration) occurs primarily through the internet. This second mechanism, represented with variations by Craigslist, eBay and others, enables users to exchange goods and services for funds or in-kind services. Through this mechanism, the user posts the availability of goods or services and transfers the goods or implements the services upon agreement of consideration for the transfer. An article must be transferred upon confirmation that the consideration has either been submitted directly to the person generating the post, or confirmation that a third party intermediary has obtained the consideration. An individual wishing to obtain consideration for a posted article must first establish an agreed-to exchange before the consideration is made available. In the situation where a third-party intermediary essentially guarantees funds availability after a transaction has been established, the individual obtains less than the agreed-to value because the intermediary retains a portion of the funds as payment for its services.

What is needed is a system and method that enables an individual to make available goods or services that the person is willing to convey in exchange for consideration. The consideration may be monetary or bartered goods or services. The system and method must be configured to permit the individual to maintain possession of an article until a transaction is agreed to. Further, the consideration must be available to the individual when the goods or services are made available for exchange rather than waiting until after the transaction has been agreed-to.

SUMMARY OF THE INVENTION

It is an object of the present invention to provide a system and method that enables an individual to make available goods or services that the person is willing to convey in exchange for consideration. It is also an object of the present invention to provide a system and method configured to permit the individual to maintain possession of an article until a transaction is agreed to. Further, it is an object of the present invention to provide a system and method to make the consideration available to the individual when the goods or services are made available for exchange rather than waiting until after the transaction has been agreed-to.

These objects are accomplished with the present invention, which is a system and related method established through computer programming as a computer program configured for access through the internet. The system and method are referred to herein as "SellSweep." The SellSweep system is a combination of a social network and an online shopping service under a common configuration. Users of the system sell goods and/or services. It provides a fun social experience as well as an outlet to gain consideration, whether in the form of money or bartered goods or services. There is a common SellSweep website. In addition, individual users may establish their own customizable webpages where they can post anything they would like to sell, including but not limited to time/labor from an already established business.

The system and method embodied in computer program establishes for a user an addto cart either on a common webpage or an individualized one. The individual's addto cart is established after the user has entered a major credit card, they will be given an addto cart feature on their page. The post will also be featured on Sell Sweep's main page, which is mostly for online shopping and is established primarily to enable access by non-members. The software has two aspects. First, when the user posts an item for sale for an asking price, a portion or all of the asking price can be added to a bank stored on the user's page. In other words, with the posting, the individual immediately has credit in the bank. Second, the user can then use the credit to shop for free on the site, or even to withdraw funds through electronic transfer regardless of whether the item first posted has been transferred to another party under an agreed-to transaction. The user will then be asked to update his/her post monthly, at which time they will be billed/incur a fee if credit has been used, again, regardless of whether the posted item has been transferred. As users continue to stay in good standing, they are given opportunity to grow their credit limit. It is to be understood that as used herein, the "credit" may be any form of credit available in an exchange including, but not limited to, traditional monetary credit, traditional credit cards, a form of credit established by the system administrator, or any form of internet-based credit such as, but not limited to Libra, Bitcoin, or other form of cryptocurrency. In addition, the transfer of credit may be in any such form.

Each user/member who has provided a major credit card is given a bank chart on their individual page. They will see a plurality of columns containing relevant information, each with a number. When the user/member has money in their bank that is deposited by them and/or represents funds transferred as the result of an item sale, the funds will show in green in the left column. If the user/member has funds in their bank from posting credits, it would appear in black in the middle column, with a subset claims number if credit has been used. It is noted that this is simply an example of the format and content of the user's information representation. That information representation is not limited by scope and/or appearance.

As indicated, the system and method are established in one or more computer programs that may be implemented on one or more computing devices that include, but are not limited to, mainframe computers, desktop computers, tablets, and mobile devices such as smart phones, for example. The one or more computer programs are arranged to improve the function of the one or more computing devices by making relevant information collection, evaluation and dissemination more efficient and easier for users to enable. The one or more computer programs may be referred to herein collectively as the computer program and the one or more computing devices may be referred to herein collectively as the computing device.

The SellSweep system is provided based on a downloadable or a non-downloadable program accessible over the internet. The program that performs an item availability upload function, a credit establishment and usage function, an item posting and credit implementation function, a data storage and modification function, and an item transfer enablement function may be located on one or more dedicated servers, it may be internet cloud based or a combination of the two. The computer program contained in one or more applications is established in software that embody the functions identified carried out through the computing device onto which the application is loaded. The software is generated using application generation tools known to those skilled in the art of producing such programs. For example, the program may be developed by generating computer instructions embodying the functions described using an iOS tool or such other tools as are suitable for generating and modifying a user interface, data gathering and storing, data integration and access, and bug fixing. The advantages of the present invention are enabled by the functionality of the applications described herein and in the accompanying figures.

The invention is a computer-based system wherein device-executable instructions are further configured to cause the computer system to implement a *Premium User Bank feature compiling of an interactive Bank with funds displayed on Premium Users home page, with options including but not limited to: 1-Transferring funds in both directions from the online bank to provided credit card information; 2-Premium User will be able to use online funds in her/her bank for purchases posted by other Premium Users; and 3-Premium User is permitted to use online funds in her/her Bank for monthly payments and/or fees relating to credit used.

The computer-based system further includes device-executable instructions configured to cause the computer system to implement the Premium User credit feature comprising but not limited to: 1-A Premium User exchanging asking price of For Sale post to credit to be used at the user's discretion; 2-A table including a plurality of color-coded columns/rows to display user funds in various state, such as clear for spending, credit acquired from personal posts, overdue credit to be billed in entirety as outlined in the following paragraph. Other forms of information disclosure are possible.

The computer-based system further includes device-executable instructions configured to cause the computer system to implement a Premium User Default method comprising a chronological check of user post statuses to determine if a For Sale post has been updated as required, payments/fees have been submitted within time allotted, sending alerts/notices of default status. Penalties for defaulting on minimum required fees/payment may result in billing for entire credit balance, account removed from the administrator, along with a ban of user from website, and/or criminal charges incurred.

The computer-based system is further configured with device-executable instructions arranged to cause the computer system to implement a Premium User Default method comprising a Premium User allotting to remove a For Sale post after some/all credit has been used and can receive payment reminders for equivalent/increased amount based on user agreement.

DETAILED DESCRIPTION OF THE INVENTION

Figure 1:
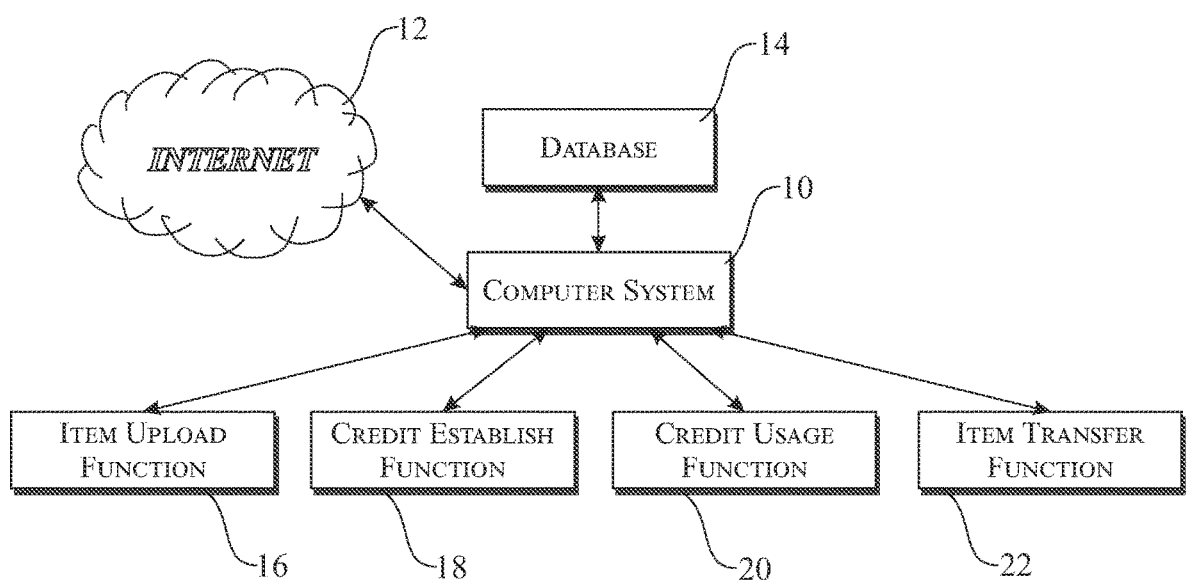
FIG. 1 is a simplified representation of the SellSweep system of the present invention.

The present invention is a system and method configured to enable users to post items for sale, immediately gain a credit upon such posting, enable communications between item offerors and item buyers to effect transfer of items, and a mechanism for retaining or exchanging the established credit. The system of the present invention is a set of functions described herein embodied in a computing system programmed to perform functional steps associated with the method described and illustrated herein. The computing system may be associated with local or remote computing means, such as one or more central computers, such as a server in a local area network, a metropolitan area network, a wide area network, or through intranet and interne connections.

The computer system may include one or more discrete computer processor devices. Examples of known computing devices that may be suitable for use with the invention include, but are not limited to, personal computers, server computers, hand-held or laptop devices, cellular phones including smart phones, multiprocessor systems, microprocessor-based systems, set top boxes, programmable consumer electronics, network PCs, minicomputers, mainframe computers, distributed computing environments that include any of the above systems or devices, and the like. The computer system may include computer devices operated by one or more users, such as through a desktop, laptop, or servers, and/or one or more providers of services corresponding to one or more functions of the invention.

The server, the computer processor, or a combination of both may be programmed to include one or more of the functions of the invention system. One or more relational databases that may be associated with the server, the computer processor, other computing devices, or any combination thereof, include information related to the use of the invention system. For example, the database includes information associated with a specific item offered, credit established and usage of that credit. The relational database of the present invention is used for gathering, storing and making accessible item, credit and other information. For the purpose of the description of the present invention, a database is a collection of stored data that are logically related. Although there are different types of databases, and the database of the present invention may be any of such types, it is preferably a relational database with a relational database management system, comprising tables made up of rows and columns. Data stored in the relational tables are accessed or updated using database queries submitted to the database system. The database may be populated and updated with information provided by an application provider capable of carrying out one or more of the steps associated with the system of the invention, one or more businesses, or any other information providers.

The invention may be described in the general context of computer-executable instructions, such as program modules, being executed by a computer. Generally, program modules include routines, programs, objects, components, data structures, etc. that perform particular tasks or implement particular abstract data types. As indicated above, the system of the present invention may also be practiced in distributed computing environments where tasks are performed by remote processing devices that are linked through a communications network or other data transmission medium. In a distributed computing environment, program function modules and other data may be located in both local and remote computer storage media including memory storage devices. Storage of program instructions and database content may thereby be cloud-based as they can be stored on remote servers and accessed through internet-based connections.

The computer processor and interactive drives, memory storage devices, databases and peripherals may be interconnected through one or more computer system buses. The system buses may be any of several types of bus structures including a memory bus or memory controller, a peripheral bus, and a local bus using any of a variety of bus architectures. The computer system typically includes a variety of computer readable media. Computer readable media can be any available media that can be accessed by the computer system and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system. The computer system further includes computer storage media in the form of volatile and/or non-volatile memory such as Read Only Memory (ROM) and Random Access memory (RAM). RAM typically contains data and/or program modules that are accessible to and/or operated on by the computer processor. That is, RAM may include application programs, such as the functional modules of the system of the present invention, and information in the form of data. The computer system may also include other removable/non-removable, volatile/non-volatile computer storage and access media. For example, the computer system may include a hard disk drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the computer system to perform the functional steps associated with the system and method of the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the computer processor. A user may enter commands and information into the computer processor through input devices such as a keyboard, a touchpad or a pointing device such as a mouse. Other input devices may include a microphone, joystick, game pad, satellite dish, scanner, or the like. These and other input devices are connected to the computer processor through the system bus, or other bus structures, such as a parallel port, game port or a universal serial bus (USB), but is not limited thereto. A monitor or other type of display device is also connected to the computer processor through the system bus or other bus arrangement.

The computer processor may be configured and arranged to perform the described functions and steps embodied in computer instructions stored and accessed in any one or more of the manners described. The functions and steps, such as the functions and steps of the present invention described herein, individually or in combination, may be implemented as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor, instruct the computer processor to perform one or more processes or acts described herein, and/or various examples, variations and combinations thereof Such instructions may be written in any of a plurality of programming languages, for example, XML, Java, Visual Basic, C, or C++, and the like, or any of a variety of combinations thereof. The computer-readable medium on which such instructions are stored may reside on one or more of the components described above and may be distributed across one or more such components.

With reference to FIG. 1, a user is granted access to an item transfer and credit system of the present invention through a computer system 10 upon completion of authentication procedures associated with an internet-based platform used to present a user interface for interaction by a user with the present invention. The computer system 10 is configured to enable a user to interact with others and the system via the Internet 12. The invention further includes a database 14 that is populated by the invention through the computer system 10. The database 14 may be modified and accessed through the computer system 10. The computer system 10 is further configured to establish, modify and permit access to a plurality of functions associated with the invention. Specifically, the functions associated with the present invention are the item upload function 16, the credit establishment function 18, the credit usage function 20 and the item transfer function 22. Access to the item transfer and credit system of the present invention is made through authentication steps of the type generally known including, but not limited to, providing a user name and a password, for example.

Figure 2:
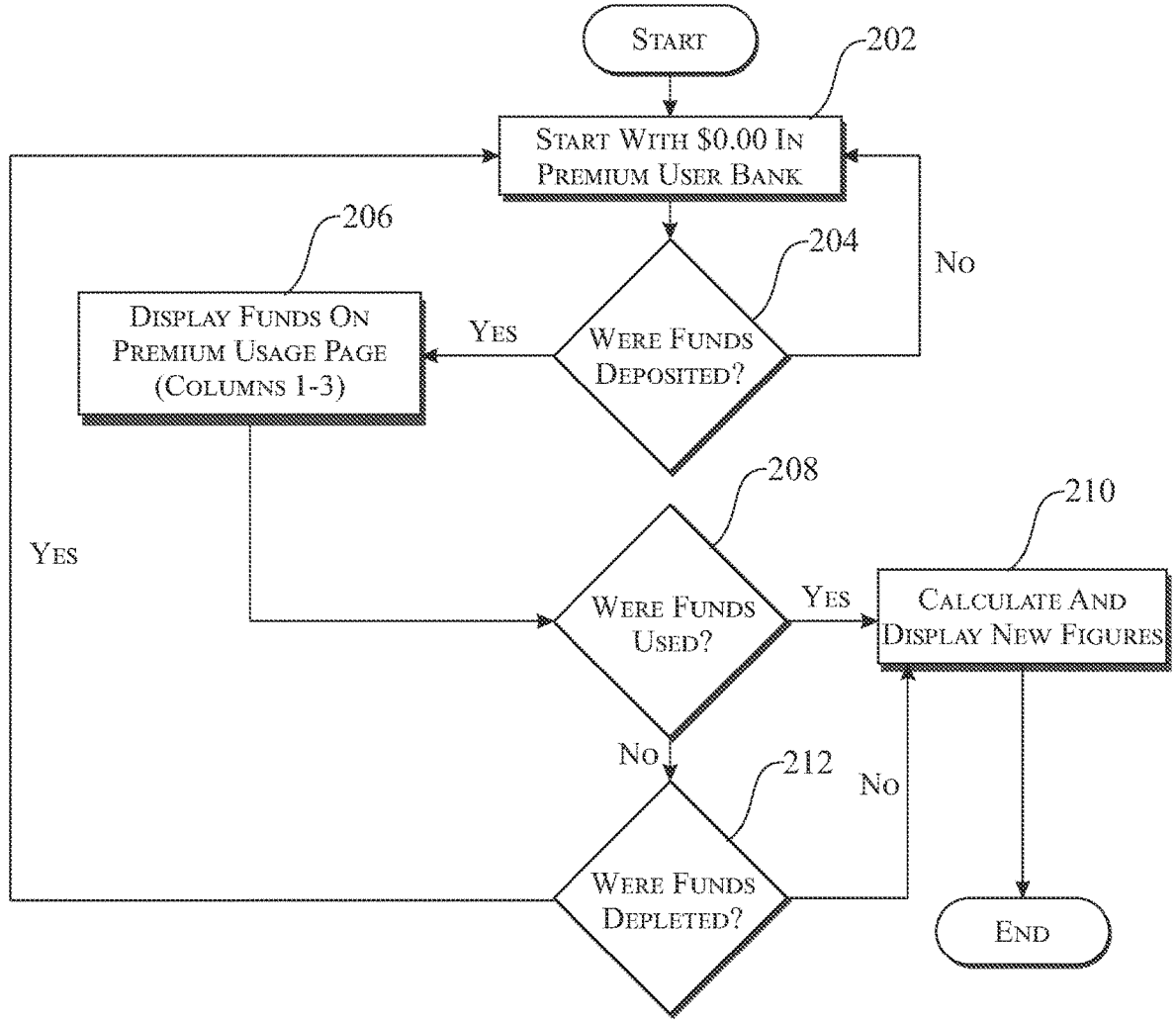
FIG. 2 is a flow diagram representing steps associated with the credit establishment function.
Figure 3:
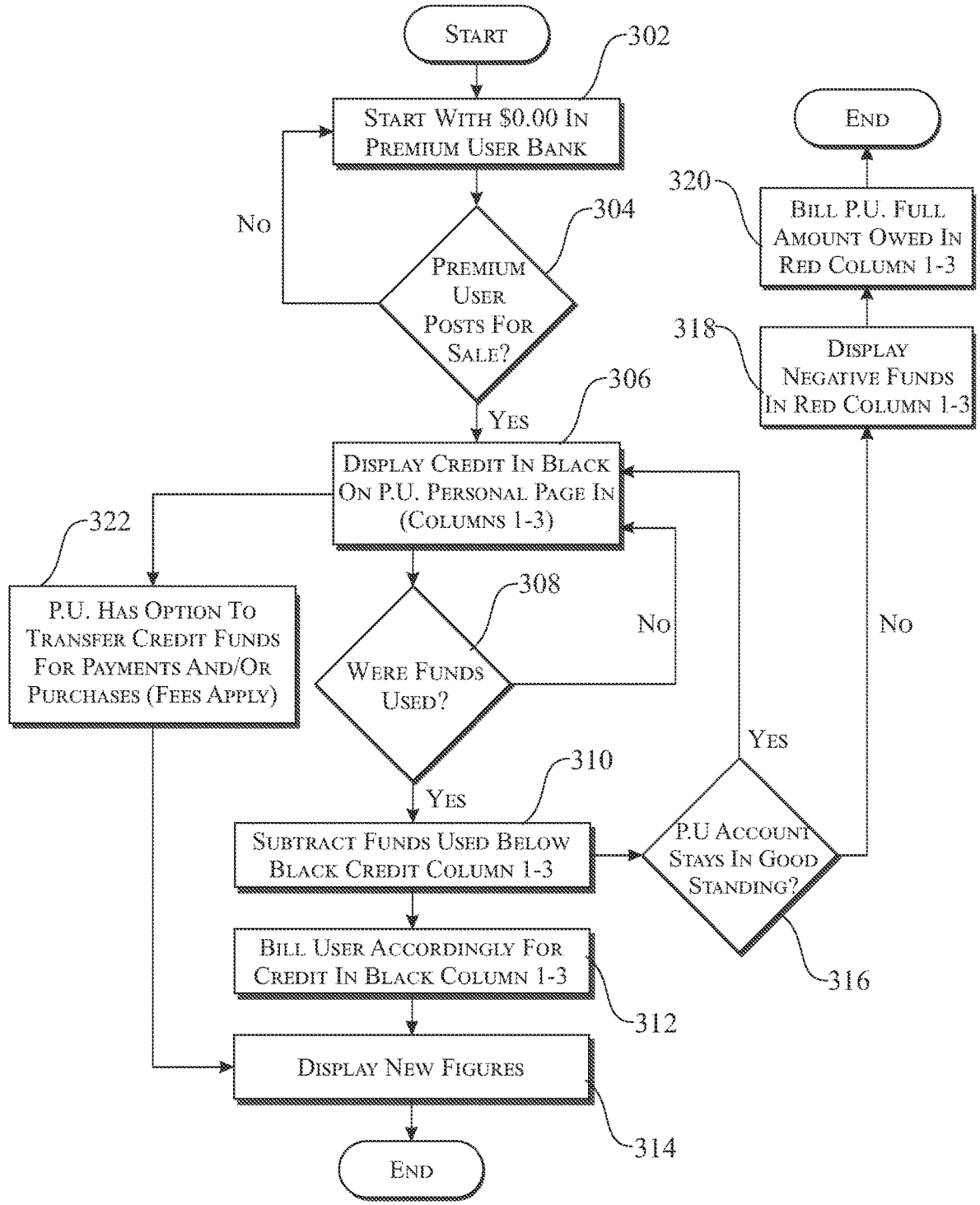
FIG. 3 is a flow diagram representing steps associated with the item upload and credit usage functions function.
Figure 4:
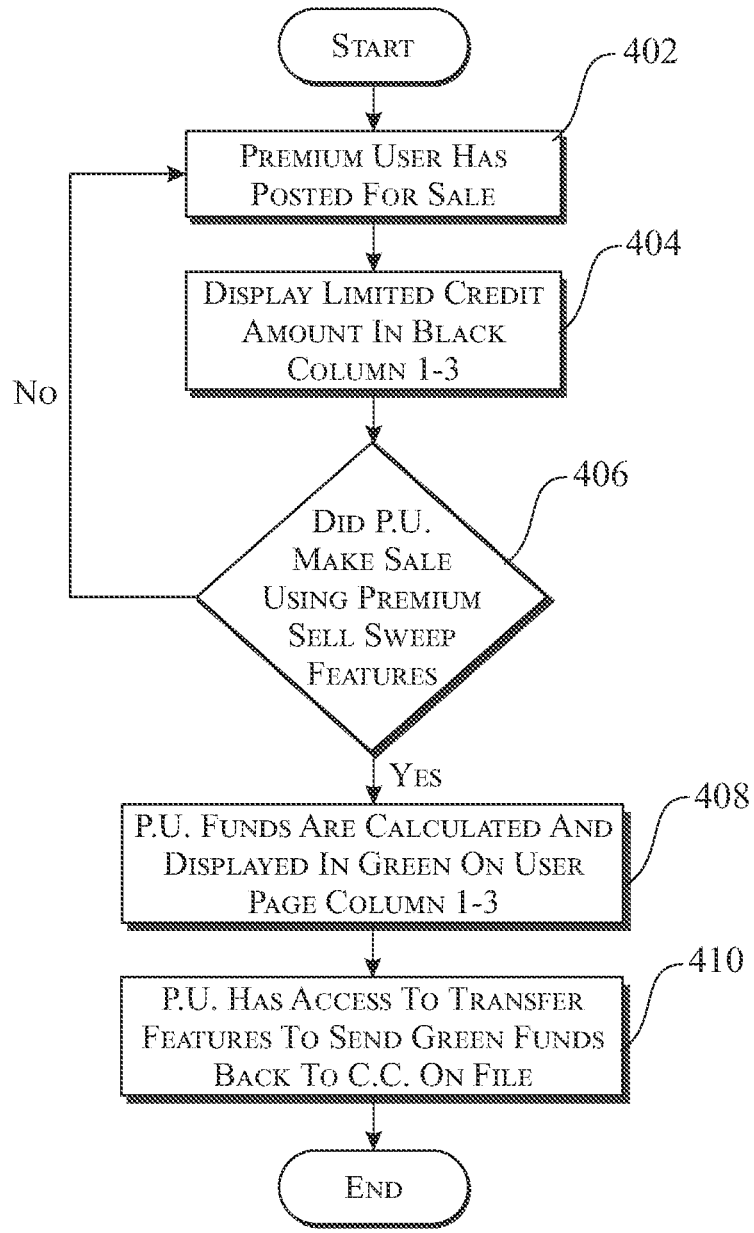
FIG. 4 is a flow diagram representing steps associated with the item transfer function.

With reference to FIGS. 2-5, the system of the present invention enables a Premium User; that is, a user who has provided credit card information to an administrator of the system, to post information about an item through the interne for interested parties to consider. The item upload function 16 enables the Premium User to post the item for sale as represented in FIGS. 3 (e.g., steps 302 through steps 320) and 4 (e.g., steps 402 through 410). The system confirms such upload. Upon affirmation of that step, the system displays to a user interface of a computer device used by the user to access the system that a credit is established as enabled by the credit establishment function 18. That credit establishment is implemented in a "Bank" account set up for the user through the system. The system permits the Premium User to select an option to transfer the credit as funds or as purchase of another item on the website associated with the system. If that option is selected, the system through the credit usage function and that usage is displayed to the user. As noted, the credit may be in any form of interest to users. In addition, transfer of that credit may also be in any form of interest including, but not limited to, traditional bank funds, cryptocurrency or another form available for users to exchange.

Figure 5:
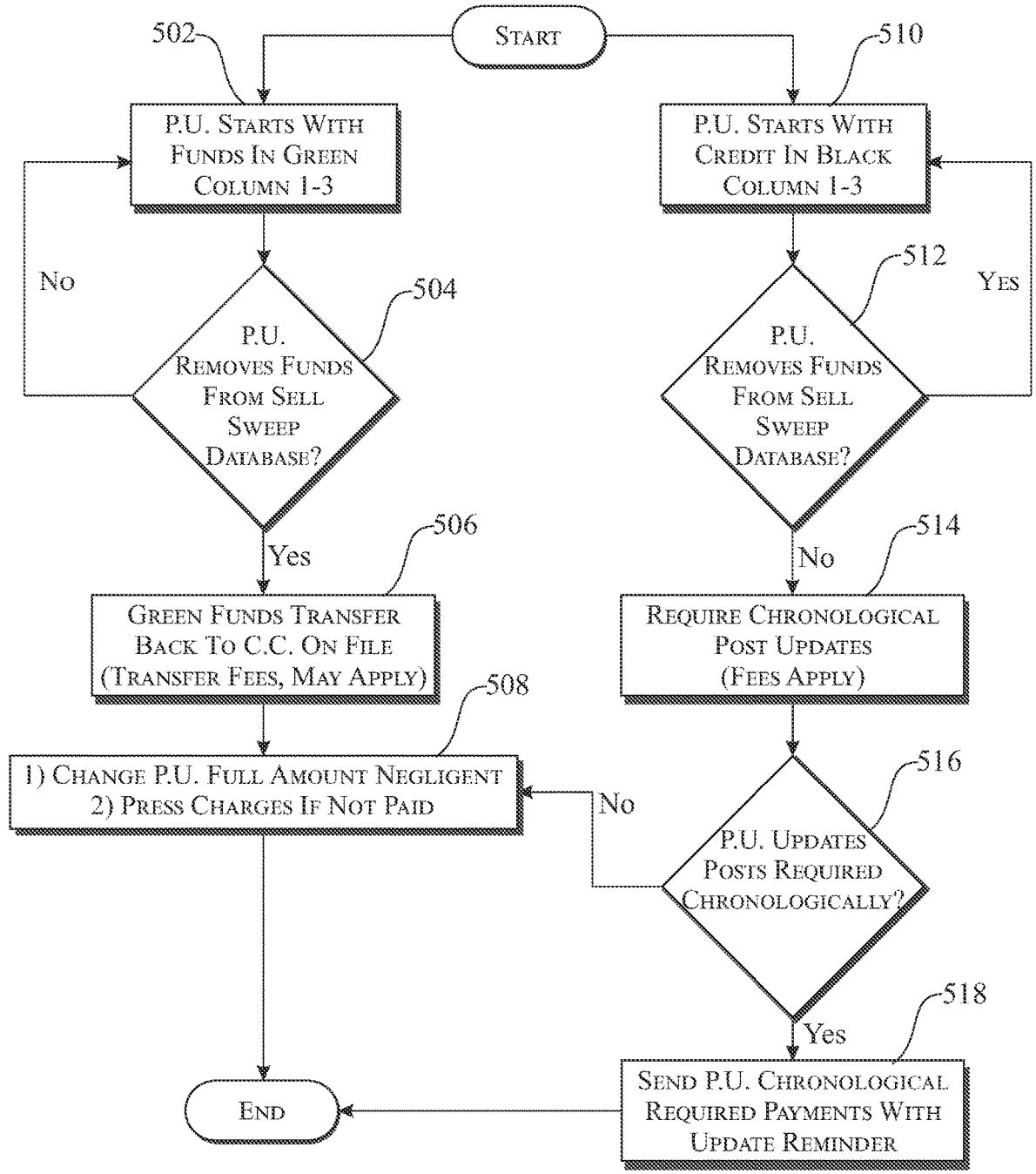
FIG. 5 is a flow diagram representing steps associated with the removal of funds from an established user bank.
Figure 6:
FIG. 6 is a simplified screen capture representing bank information available to a user on his or her individual webpage.

With continuing reference to FIGS. 2-5, the system upon querying the credit usage function 20 to determine credit usage through funds transfer subtracts those funds from the user's Bank account (see, e.g., FIG. 5, steps 502 through 518). That subtraction is represented to the user on the interface. FIG. 6 illustrates an example of the depiction of the Premium User's Bank account 600, with distinctions made for credit granted, credit or funds usage, and a negative credit usage. The user information is not limited to these details or the format represented. Other information may also be supplied and in any range of forms that the administrator may develop and/or that users may find to be of interest. An aspect of the credit establishment function 18 is a module of the system that confirms whether the Premium User has deposited funds or credit to her or her account as represented in FIG. 2 (see, e.g., steps 202 through 212). As shown in FIG. 3, upon completion of a sale of the item, the Premium User's Bank account is updated to reflect the occurrence of that transaction. With that affirmation, the Premium User can maintain the credit or convert it into accessible funds. The ledger for the user is updated accordingly. Again, the form of credit and the form of the transferred credit may be of any type available to users.

It is to be noted that individuals may use the system of the present invention without becoming Premium Users However, they would have limited ability to receive advance credit for a posted item. Instead, a credit would be established for them upon completion of a transfer of the posted item.

It is further to be noted that the system is configured through the credit usage function 20 may be used to effect a loan to a Premium user by allowing the user to access credit for the purpose of converting it into funds that the user could use as desired. That could be done in anticipation that a sale of the item will occur. However, in the event the sale has not occurred after a specified period of time, the system administrator would be authorized to charge the Premium User's credit card on file to take out all or a portion of the funds that were withdrawn with an interest charge. The process could continue until all withdrawn funds have been repaid.

Once an item sale has been agreed to between the system user and a buyer who has accessed the system via the internet, the item transfer function 22 enables delivery of the item from the user to the buyer. That may be accomplished in a number of ways including, for example, the item transfer function 22 generating a shipping label with the buyer's address, posting that shipping label to the user's account upon which the user would print the label, apply it to a box containing the item and delivering it to a post delivery facility. The system may be arranged to hold the buyer's funds for crediting to the user until after confirmation of delivery of the item.

The item transfer function 22 is further configured to enable affirmed transfer of services in the event the item is a service rather than a physical item. In the case, the system is arranged for the buyer or the user to post completion of the service before credited funds are released to the user. If the user posts the completion, the system is arranged to await confirmation from the buyer before effecting funds access to the user. Additionally, the user may use credit to obtain the services of another user.

Having thus described the system and method of the present invention in an exemplary form, it is to be understood that various alterations, modifications and improvements are contemplated by the invention without deviating from its scope and spirit as established by the appended claims.

What is claimed is:

1. A system configured to improve the operation of a computing device to enable a user to post on the internet an item for sale, obtain a credit therefor, access the credit and convey the item, the system comprising:

the computing device arranged for access to the internet and having stored thereon computer-executable instructions configured to cause the computer device to implement instructions;

a database of information accessible through the computing device, wherein the information of the database includes item information, user information, credit information, credit transfer information and item transfer information;

an item upload function arranged to enable the user to post information about the item that the user wishes to sell, wherein the user determines and posts the value of the item for sale;

a credit establishment function arranged to establish a credit for the user based on the posting after the user has uploaded information regarding the item for sale, wherein the credit establishment function is arranged to make the credit available for the user to access immediately upon posting the item;

a credit usage function arranged to permit the user to store the credit or convert the credit into funds accessible by the user, wherein the credit usage function is further configured to calculate user credit usage, post information for the user regarding credit usage status, and establish a mechanism for the user to reimburse for credit usage before or after sale of the item; and an item transfer function arranged to enable transfer of the item to a buyer who has posted payment for the item at an agreed-to price.

2. The system of claim 1 wherein the item may be new or used, a physical item or a service.

3. The system of claim 1 wherein the credit establishment function is arranged to provide a plurality of credit access options including a premium user option, wherein the premium user option permits the user to post the item and receive credit based on the value of the item assigned by the user.

4. The system of claim 3 wherein access to the system is free but access to the system as a premium user requires the user to provide personal credit card information that is uploaded to the database.

5. The system of claim 3 wherein item posts by premium users are given highest priority for item search access and additional system services.

6. A method to enable a user to post on the internet an item for sale, obtain a credit therefor, access the credit and convey the item, the method comprising the steps of:

accessing the internet through a computing device having stored thereon computer-executable instructions configured to cause the computer device to implement instructions;

uploading information to a database of information about the item that the user wishes to sell, wherein the user determines and posts the value of the item for sale, and wherein the database is accessible through the computing device, wherein the information of the database includes item information, user information, credit information, credit transfer information and item transfer information;

establishing for the user a credit for the user based on the posting after the user has uploaded information regarding the item for sale, wherein the credit establishment is arranged to make the credit available for the user to access immediately upon posting the item;

permitting the user to store the credit or convert the credit into funds accessible by the user;

calculating user credit usage;

posting information for the user regarding credit usage status;

establishing a mechanism for the user to reimburse for credit usage before or after sale of the item; and enabling transfer of the item to a buyer who has posted payment for the item at an agreed-to price.

* * * * *